Figure 2:
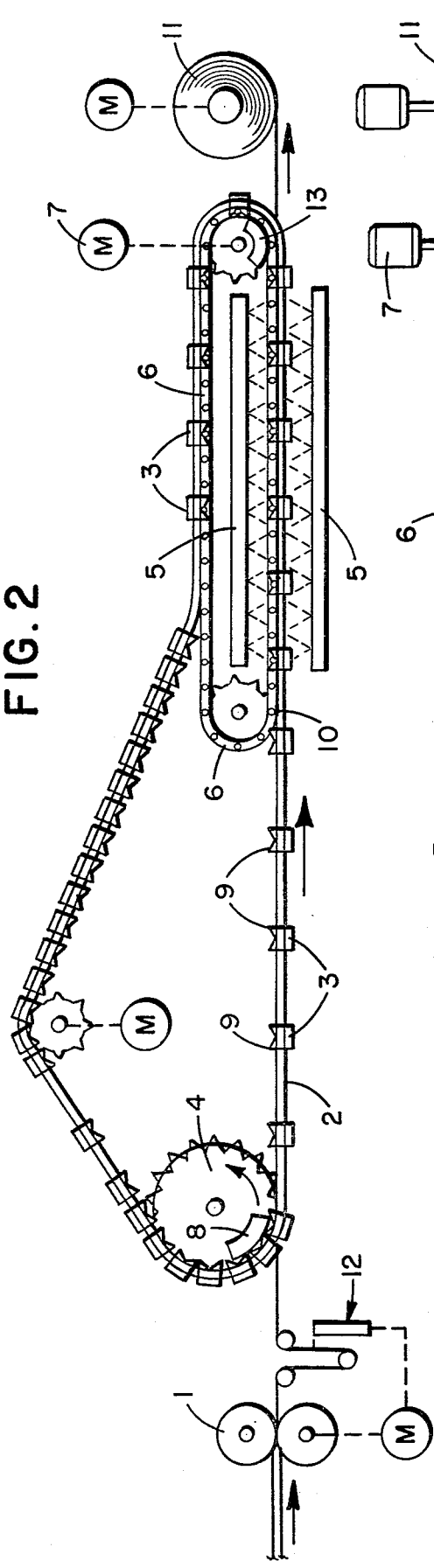
Figure 1:
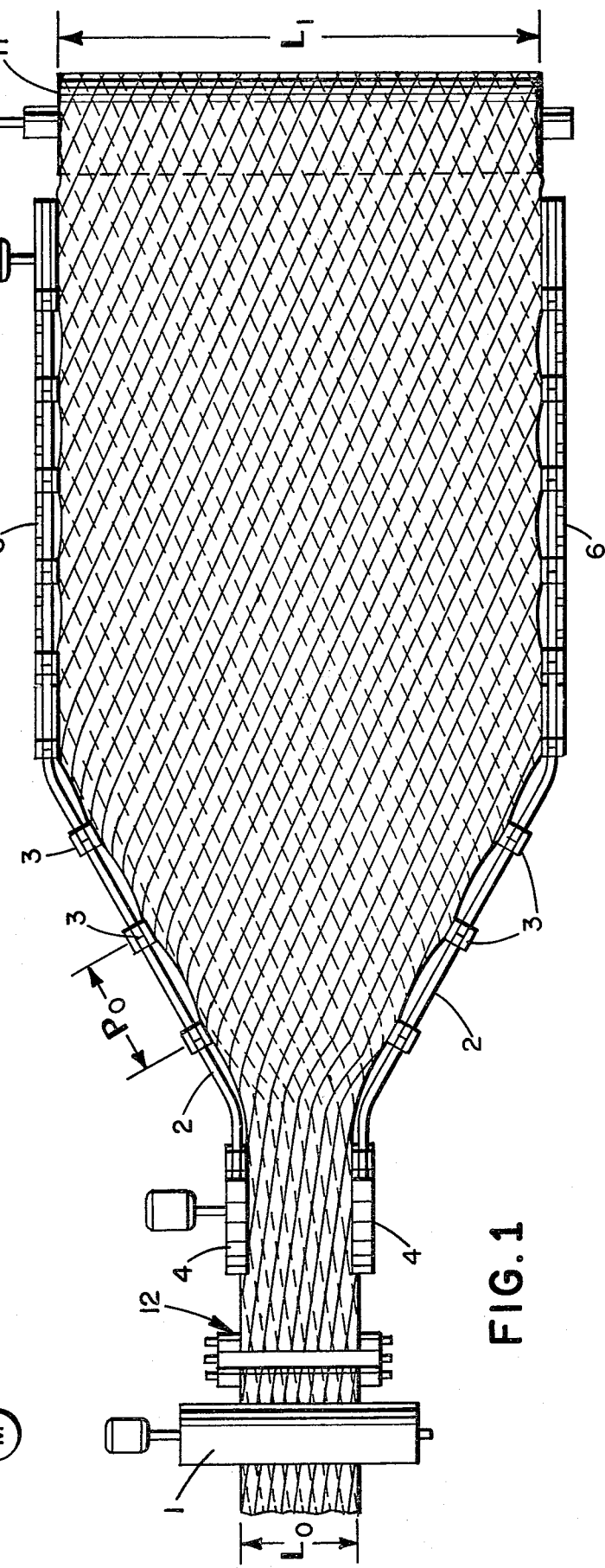
Figure 3:
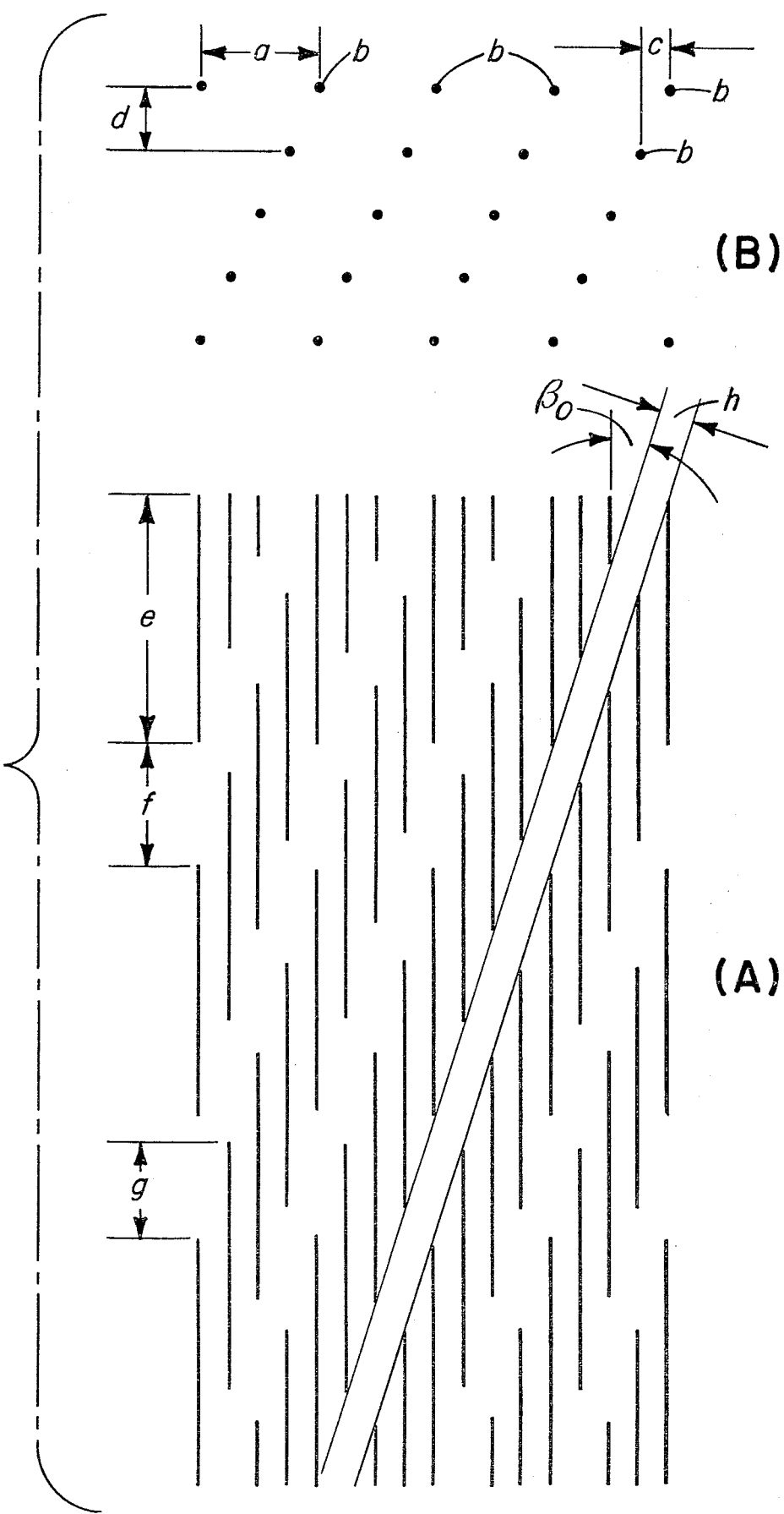

United States Patent [19]

Vittone et al.

[11] 4,426,343
[45] Jan. 17, 1984

[54] PROCESS FOR PRODUCING COMPOSITE RETICULAR STRUCTURES

[75] Inventors: Andrea Vittone, Milan; Edoardo Furia, Florence, both of Italy

[73] Assignees: Montedison S.p.A.; Moplefan S.p.A., both of Milan, Italy

[21] Appl. No.: 307,624

[22] Filed: Oct. 1, 1981

Related U.S. Application Data

[63] Continuation of Ser. No. 150,708, May 19, 1980, abandoned.

[30] Foreign Application Priority Data

May 18, 1979 [IT] Italy ................................ 22800 A/79

[51] Int. Cl.$^3$ .............................................. B29C 17/14
[52] U.S. Cl. ................................... 264/147; 264/136; 264/154; 264/235.8; 264/288.8; 264/290.2; 264/DIG. 47; 428/137
[58] Field of Search ................... 264/290.2, DIG. 47, 264/146, 147, 154, 171, 235.8, 288.8; 428/137; 26/71, 79, 89, 93

[56] References Cited

U.S. PATENT DOCUMENTS

| | | | |
|---|---|---|---|
| 3,014,234 | 12/1961 | Koppehele | 264/290.2 |
| 3,046,599 | 7/1962 | Nicholas et al. | 264/290.2 |
| 3,172,151 | 3/1965 | Glossmann | 264/290.2 |
| 3,256,558 | 6/1966 | Andersen et al. | 264/290.2 |
| 3,428,506 | 2/1969 | Johnstone | 264/DIG. 47 |
| 3,454,455 | 7/1969 | Rasmussen | 264/DIG. 47 |
| 3,548,048 | 12/1970 | Hughes et al. | 264/DIG. 47 |
| 3,655,501 | 4/1972 | Tesch | 428/137 |
| 3,676,539 | 7/1972 | Fisher | 264/290.2 |
| 3,966,597 | 6/1976 | Omori et al. | 264/DIG. 47 |
| 3,968,287 | 7/1976 | Bolk | 428/137 |
| 4,076,785 | 2/1978 | Schmidt | 264/290.2 |
| 4,200,963 | 5/1980 | Kamfe et al. | 264/290.2 |

FOREIGN PATENT DOCUMENTS 1171971 11/1969 United Kingdom ....... 264/DIG. 47

Primary Examiner—James B. Lowe

[57] ABSTRACT

There are disclosed a process for the continuous production of open, composite reticulated structures consisting of at least two superimposed or overlapping fibrilled films of synthetic polymers, and apparatus for effecting the transversal opening or stretching (with respect to the slitting or fibrilling direction) of a fibrilled film or of a combination of at least two superimposed fibrilled films and which comprises a feeding system for the fibrilled film, a pair of diverging guides each closing upon itself in the form of a ring for transverse stretching of the film, a series of clamps sliding on guides for gripping the edges of the film or film assembly, means for feeding the clamps to the guides, a series of two pulling means for engaging the clamps, means for opening the clamps and dragging them along the guides to the feeding devices, and means for take-up of the open film or the assembly of open films.

6 Claims, 3 Drawing Figures

PROCESS FOR PRODUCING COMPOSITE RETICULAR STRUCTURES

This is a continuation of application Ser. No. 150,708 filed May 19, 1980, now abandoned.

BACKGROUND OF THE INVENTION

The fibrillation of synthetic polymer films is an operation that has been known for quite some time and in general has been used in the manufacture of ropes, strings, textile staples, as well as for obtaining flat reticular structures suited for use as reinforcement (stiffening) of laminated materials such as, for instance, paper, cement slabs, non-woven fabrics, etc.

Among the various methods for preparing the above mentioned structures, the most important consist in embossing or slitting mono-oriented films by means of heated points or blades, and by then stretching or extending the film thus obtained crosswise (transversally), thereby imparting a netlike structure to it.

Such methods are described in U.S. Pat. No. 3,137,746 and in British Pat. No. 1,083,847.

According to British Pat. No. 1,337,442 the crosswise stretching operation is made to follow the superimposition or overlapping of the single nets at a certain angle to each other, in its turn followed by a lamination of the assembly of superimposed nets in order to obtain one single composite net-shaped structure.

Since the crosswise stretching of the fibrilled film is a difficult and delicate operation, the continuous preparation of such composite structures requires at least two distinct operations, the first being the stretching and the second being a superimposition, carried out with lines of machines in an angled position to each other. The extreme lightness and delicacy of the material, the phenomenon of longitudinal shrinkage of the film during the crosswise extension, as well as the poor resistance of the fibrils to longitudinal slip stresses are all elements that make the stretch-reticulation operation quite critical and thus hinder, in this case, the use of the conventional stretching or opening systems used in the textile art, such as clamps or pins supporting chains or other rigid retractor elements of like kind.

On the other hand, the fibrilled film opening systems already suggested in the prior art, and which consist, for instance, according to French Pat. No. 1,331,095, in compressing the film between elastic bands while the bands are forced to expand transversally, have limits and present difficulties with regard to the achievement of micro-fibrilled structures, as well as with regard to the application of the method to the continuous preparation of composite structures with a plurality of mutually angled layers of nets.

THE PRESENT INVENTION

One of the objects of this invention is to provide a process for the continuous production of open composite reticulated structures consisting of at least two superimposed or overlapping fibrilled films.

A further object is to provide apparatus for the transversal opening or stretching (with respect to the direction of the slitting or fibrilling) of a fibrilled film or of a combination of at least two superimposed fibrilled films, which avoids the drawbacks and difficulties of the prior art.

The process of this invention consists in the following steps performed in the given order:

(1) preparation of a film formed of at least one synthetic polymer and having a thickness comprised between 35 and 1,200$\mu$;

(2) longitudinal or prevailingly longitudinal orientation of the film by means of known mono-axial stretching methods, with longitudinal drawing ratios comprised between 4 and 15, and with the formation of an oriented film with a thickness comprised between 15 and 200$\mu$;

(3) fibrilling of the film thus oriented by passing it over surfaces fitted with pins, blades or other similar means for producing slits, and the consequential formation of oblique unfibrilled bands (as defined in more detail below) forming an angle $\beta_o$ with the direction of the slits of the film comprised between about 0.30° and about 50°;

(4) superimposition of at least two films thus fibrilled with the oblique bands of each film intersecting the oblique bands of the other at any desired angle and any desired alternation;

(5) transverse stretching of the assembly or pack of superimposed films, thereby achieving a rotation on the plane of the oblique unfibrilled bands of each film, until these form, with the original direction of the slits, a new angle $\beta_\epsilon$ with the values comprised between $\beta_o$ and $\pm 80°$ with respect to the direction of the slits;

(6) thermostabilization of the assembly of the stretched and superimposed films.

The preparation of the starting film may be carried out according to any of the known methods for forming films of synthetic polymers, such as, for instance, by extrusion, casting, etc. Polymers usable for the purposes of this invention include olefinic polymers, such as polyethylene and polypropylene, the polyamides, the vinyl polymers such as polyvinyl chloride, polyester resins, as well as mixtures of said polymers.

The fibrillation of the oriented film is achieved by passing the film over rollers, or, in general, on surfaces provided with either blades or pins or projections having an orderly and predetermined geometrical arrangement, such as to be reproduceable on the film in the form of slits.

Fibrillation methods of this type are described, for instance in British Pat. No. 1,073,741.

In the accompanying drawing,

FIG. I is a plan view of apparatus according to the invention;

FIG. II is a side view of the apparatus of FIG. I; and

FIG. III represents, by way of example, a film having an orderly pattern of slits, and also illustrates the elements (a) to (e) described in detail hereinafter.

Referring first fo FIG. III,

A represents, by way of example, a film having an orderly pattern of slits;

B shows the arrangement on the plane of the slitting elments of FIG. I, such as, for instance, the points of needles on a fibrilling roller;

a=the distance between 2 needles arranged on a generating line of the cylindrical roller;

c=the distance between 2 needles arranged on adjacent circumferences of needles, and also the distance between 2 adjacent slits;

d=the distance between adjacent generating lines of needles;

e=the length of a slit;

f=the unslitted stretch between two successive slits;

g=the stagger between the slits, that is, the distance between the starting or end points of two adjacent slits;

h = the width of the oblique unfibrilled band, consisting ideally of the oblique succession of the stretches of unslitted film; and $\beta_o$ = the obliquity of such band, that is, the angle which said band displays in the not transversally stretched fibrilled film, with respect to the direction of the fibrillation of the film.

The angle ($\beta_o$) will have a clockwise or counterclockwise direction and, thus, a positive or negative sign, with respect to the direction of the slitting of the film, depending on the respectively right-handed or left-handed arrangement of the needles. The angle $$\beta_o = \frac{(c)}{(g)} = \frac{\text{distance between two adjacent slits}}{\text{stagger between slits}}$$

wherein the value (g) of the stagger between the slits may be pre-arranged, in the case of the use of fibrilling rollers, on the basis of the ratio $$K = \frac{\text{advancement speed of the film}}{\text{peripheral speed of the pins on fibrilling roller}}$$

taking into account the relationship: (g) = K times the distance between adjacent generating lines of needles (d).

Thus, angle $\beta_o$ of the oblique unfibrilled bands is easily pre-determined at will within the above-indicated limits, with a suitable pattern of the fibrilling system, for instance on a needle roller, and with respect to the fibrilling procedures.

As stated, this invention contemplates fibrillating in such a way as to obtain angular values of $\beta_o$ comprised in the range of from about 0.30° to about 50° C.

Typical values for the parameters defined above are, for instance:

(c) = 0.1 mm
(d) = 25 mm
K = 0.70
$\beta_o$ = 0.33°
(c) = 1.6 mm
(d) = 2.5 mm
K = 0.54
$\beta_o$ = about 50°

The fibrillation may be carried out with one or more superimposed films on the same fibrillating device or on the single separate films, each of which is fibrillated on a fibrilling device having a different needle distribution pattern, so as to obtain from the same fibrillation line the production of films with difference $\beta_o$ angles, necessary for the manufacture of a reticulated and multi-oriented end product.

The superimposition of the fibrilled films is preferably carried out in such a way as to insure that the oblique unfibrilled bands of each film do not coincide with each other, and so that said bands will form varied angles, in order to obtain a reticulated assembly endowed with characteristics that, so far as possible, are isotropic.

The alternation of the superimposed films may be as desired, especially in the case of films which, although having different fibrilling patterns, show in the course of the successive stretchings-out to a net, longitudinal shrinkages of the same order of magnitude, at equal transversal stretching.

Preferably, the pack obtained by the superimposition of the single fibrilled films is welded at the edges so as to facilitate the successive operations.

The welding operation may also be carried out on the pack of stretched-out and superimposed nets, with successive trimming of the molten edges.

The transversal stretching-out of the assembly of superimposed films may be preceded by impregnation of the assembly with sizing and/or glueing products such as polyvinyl-acetate or an aqueous carboxymethyl-cellulose solution, in order to render the product more solid and more readily handled, and, at the same time, to favor its adherence to the products to be reinforced.

The impregnation may be achieved, for instance, by dipping, spraying or by passing the products between rollers, according to known methods.

Said impregnation may also be carried out, instead of on films before the stretching-out, on already stretched-out nets, using the methods indicated.

The transverse stretching-out of the pack of fibrilled films must be such as to produce a rotation of the oblique bands on the plane until they form, with the direction of the film slitting, a new angle $\beta_\epsilon$ with a value comprised between $\beta_o$ and $\pm 80°$ with respect to the direction of the slitting.

Theoretical considerations and experimental measurements show that between the transverse stretch values and the difference ($\Delta \beta$) between $\beta_\epsilon$ and $\beta_o$; expressed in radians, there exists a relationship:

$$\Delta\beta = C \times (E - 1)$$

wherein $E$ = extent of stretch = $\frac{\text{final width of the film}}{\text{starting width of the film}}$ and where C is a constant that depends on the distribution or layout of the slits in the fibrilled film, and that may also be determined experimentally on any type of such film.

Thus, by properly choosing the values of $\beta_o$ and of the characteristic dimensions or sizes of the fibrilled film indicated in FIG. III of the drawing (c), (e), (f) and (g), it is possible to obtain with the same by crosswise extension (e), a series of different values of $\beta_\epsilon$ for each type of fibrillation of the films, consequently obtaining a composite net of different layers, each having its own, predetermined angle of the non-fibrilled oblique bands.

Since, moreover, the rotation of the oblique non-fibrilled bands occurs always in the polar direction of the starting angle $\beta_o$, the stretching out of films having starting angles $+\beta_o$ and $-\beta_o$, will lead, in the stretched-out net, to final angles $+\beta_\epsilon$ and $-\beta_\epsilon$, and, thus, to crossed angles. The combined recticular product thus obtained is, therefore, formed of layers of nets which display oblique unfibrilled bands arranged according to angles different in value and sign with respect to the direction of extrusion of the original film, and arranged (laid out) in any desired alternating order or succession.

Once the transverse or cross-stretching of the fibrilled film has been accomplished, the opened composite net thus obtained is stabilized dimensionally by thermal treatment that may consist in an inhibited (impeded) shrinkage passage through an oven or on a calender with heated pressure rolls at a temperature below that of the softening temperature of the polymer or polymers constituting the film. The net thus stabilized may be gathered in rolls or on reels ready for use.

The composite reticulated structures thus obtained are easy to handle, and the various layers or fibrilled films forming said structures may be welded to each other for lamination with other materials, or they may be loose for impregnation with liquid or pasty substances such as hydraulic binders, bituminous, waxy or pasty substances such as hydraulic binders, bituminous, waxy or pasty substances.

The process for their preparation, as described above, is simple and may be carried out without interruptions or discontinuities, from the polymer up to the finished product, at industrially convenient operating speeds, and allows to obtain a wide range of products as concerns weight, size, orientation and dimensions of the fibrils, and the number of layers of fibrilled films.

The net-opening apparatus for fibrilled films shown in FIG. I, obviates the difficulties so far met in this type of operation, and more particularly the drawbacks due to the phenomenon of longitudinal shrinkage of the fibrilled film, which occurs during its opening to form a net, and which leads easily to the rupture of the film when openings of a certain amplitude are to be achieved, or to the distortion of the unfibrilled bands when the opening is very limited. The present apparatus overcomes such drawbacks and may be used either for the opening of the single fibrilled films, or for the opening of a combination of superimposed fibrilled films, and for their continuous transformation into open reticulated composite structures.

Substantially, the apparatus according to this invention comprises:

(a) a feeding system for the fibrilled film or for an assembly of superimposed fibrilled films;

(b) a pair of diverging closed guides, which guides, near the feeding system, at the start are spaced from each other by a length that is equal to the initial width of the film and are then diverged from each other up to a mutual distance equal to the desired width of the extended or opened film.

(c) a series of clamps sliding freely on guides (b), so arranged as to allow them to grip the film or assembly of fibrilled films at its edges;

(d) a pair of devices for feeding the clamps (c) to the guides;

(e) a series of two pulling devices designed to rigidly engage clamps (c), said devices having a positive drawing or pulling motion in the direction of the feeding of the film or assembly of superimposed films;

(f) a device suited for opening the clamps and for conveying them along the guides to the feeding couple (d); and (g) a gathering device for the film or assembly of opened films.

In FIG. I, are shown the feeding means 1 for the fibrilled film or for the pack of superimposed fibrilled films, which means may consist of a pair or a series of driving rollers; a pair of guides 2, which, in this specific case, at the start are parallel and distant from each other by a length $L_o$, and which then diverge from each other up to a distance between them $L_1$; clamps 3 provided with teeth 9 designed to mesh with the links of the conveyor chain 6; the feeders 4, which in this specific case consist of wheels with cavities which pick up the clamps and insert them on the guides, at a mutual distance $P_o$; a means 8 which opens the clamps so that they may grip the film; a set of two stud chains 6 which act as driving or drawing means and engage the teeth of the clamps at the engaging point 10, and which are driven by motor 7 in the direction of the feeding of the film; a means 13 which opens the clamps so that these will release the film or pack of stretched films, and which, by the upper part of chains 6, will then carry them back to the feeders 4; and the winding-up device 11 for gathering the film or pack of extruded films.

From the aforesaid, it results that the film or pack of fibrilled films enters guides 2, is grasped by the sliding clamps 3 initially discussed from each other by a distance $L_o$, is thereupon forced to expand in the widening stretch of the guides 2 up to a width $L_1$, necessary to bring the angle of the oblique unfibrilled bands to the desired value.

Since the fibrilled film is dragged by the clamps only beginning from the insertion point 10 of the chains 6 onward, the film will be free to shrink longitudinally along the whole stretch in which it is subjected to transverse stretching, thereby drawing the clamps 3 closer to each other.

The pair of guides 2 may diverge from each other at equal or different angles with respect to the longitudinal axis of the device. The relationship $L_1/L_o$ between their maximum and minimum distance constitutes the transversal stretch ratio of the film. The clamps, free to slide along the guides, are operated by a spring and, in the apparatus as illustrated in FIGS. I and II, are always in the closed position; they only open upon command, through means 8 and 13 which may be, for instance, especially shaped cams according to techniques well known in the art.

If it is desired, or becomes necessary, to stabilize dimensionally the reticular shape of the stretched film or pack of stretched film before their winding-up, a heating means 5, for instance operating on either hot air or by radiant energy, may be inserted into the apparatus of the invention, between the engaging point 10 and the clamp opening means 13.

A regulating means 12 for the longitudinal tension of the film is preferably inserted between the feeding means 1 and the point of insertion of the film between the guides 2.

Such regulating means serves to maintain constant, and at the lowest possible values, the longitudinal tension of the film at the inlet of guides 2, so as to allow the successive shrinkage due to the transverse extension or stretching.

At the outlet of the opening and thermostabilizing means, before the clamp opening means 13, there may be arranged, in series, equipment for the welding of the edges of the nets as well as means for the hot compression and coherence of the packs of stretched-out nets.

More particularly, the hot compressing (or calendering) operation of the pack of stretched-out nets may be necessary because the extension or stretching causes a distortion of the shorter fibrils of the net, which then leave the planar arrangement, (stick out of the planar disposition). This sticking out is partly a favorable phenomenon since it acts as a natural link between the layers of nets which are thereby bonded to each other, but at the same time it increases the apparent volume of the nets, a fact that may be a disadvantage in impregnating the nets with liquid or pasty products.

The compression operation, even if not always necessary, and not shown in FIGS. I and II, has the purpose of reducing the apparent volume and at the same time of imparting greater cohesion of the layers to each other, by fixing in a permanent way mutual interlinkages among the secondary distorted fibrils.

The compressing (or calendering) is carried out according to known-methods between pairs of heated rollers or bands, at temperatures below those of the softening temperature of the polymer used.

Depending on the use for which the nets are destined, the compression may be carried out at a pressure of between 0.05 and 2 kg/sq.cm. Lastly, the winding up or gathering means 11 may consist of a series of reels on which the reticulated product is wound up, or it may consist of a support of paper, film, fabric or of other similar materials.

Various modifications can be made in the particular apparatus illustrated in FIGS. I and II, provided that there will be satisfied the possibility of longitudinal shrinkage of the film during its opening, and, moreover, to maintain the stretching (extension) of the film, without interruptions or discontinuities between the stretching and the thermostabilization phases, which would cause the net to lose, in an uncontrolled way, part of the acquired extension or stretch.

In the following are given, for exemplary purposes, but without any limiting effects, some modifications which may be made in the apparatus of this invention:

the clamps may be so built as to remain always closed, as in FIG. I; in that case, means 8 must open them so that they can grip the film; or they may be built in such a way as to be always open, in which case, along guides 2, in the opening and in the thermostatibilization zones of the slitted film, there must be provided means, for instance, suitable profiled cams, for keeping the clamps closed;

the opening and closing of the clamps may be carried out by electromagnetic, hydraulic or pneumatic systems instead of mechanically, following the known techniques;

the clamps may be substituted by systems of needles or pins penetrating the fibrous structure;

the pulling devices defined under (e) may be, in addition to chains, also electromagnetic, pneumatic or hydraulic pulling systems;

the clamps may also drag the film along by gravity, without the need of pulling systems, by giving to the pair of diverging guides either a vertical or oblique arrangement;

the clamps may be connected with one another mechanically also in the opening stretch, for instance, by means of a chain, provided, however, that the connecting elements, for instance, the links of the chain, may gradually draw nearer to one another as the film is opening up, for instance, by means of a profiled cam. Such a system will, however, require the adaptation of the profile of the cam for each type of fibrilled film, depending on the peculiar relationship existing between the stretching and the longitudinal shrinkage of the latter;

with reference to FIG. I, device 4 for the periodical feeding of the clamps to the guides 2, which in said figure is represented as a toothed driving wheel comprising, as opening means 8, a fixed cam for opening the clamps by pressure may be replaced by other systems such as, for instance, by an electro magnetic impulse-controlled pusher or a hydraulic or pneumatic, intermittently working system;

with reference to FIG. II, means 8 and 13 for opening the clamps, which in said figure consist of a simple fixed cam exerting a pressure on the jaws of the clamps, may be replaced by other means such as, for instance, electromagnetic systems controlled by a microswitch that is in contact with the arriving (incoming) clamps, or by hydraulic or pneumatic systems.

The following examples are given just to illustrate the invention in more detail and are not intended to be limiting.

EXAMPLE 1

On a tubular film extruder there was produced a polypropylene film, using a polymer with a M.I.=6.7 and with a melt temperature of 165° C.

The film was 120 micron thick and was stretched longitudinally at a temperature of 150° C. and with a drawing ratio of 9.

The film thus obtained, 40 micron thick and 80 cm wide, after the cutting of the selvedges, was subdivided into 4 films, each 20 cm wide.

The 4 films were passed at a feeding rate of 40 meters/minute, respectively over 4 fibrilling rollers having, according to the symbols previously indicated herein, the following arrangement of the needles:

|  | (a) (in mm) | (c) (in mm) | (d) (in mm) | Arrangement of needles | Diameter of roller (in mm) |
| --- | --- | --- | --- | --- | --- |
| First roller | 1.0 | 0.25 | 4.0 | + | 81.5 |
| Second roller | 1.0 | 0.25 | 4.0 | − | 81.5 |
| Third roller | 1.0 | 0.25 | 8.5 | + | 108.0 |
| Fourth roller | 1.0 | 0.25 | 8.5 | − | 108.0 |

The first and second rollers revolved at a peripheral velocity of 61.5 meters/minute, while the third and fourth rollers revolved at 100 meters/minute.

The 4 fibrilled films, according to the symbols previously specified, had respectively the following characteristics:

|  | (c) (in mm) | (e) (in mm) | (f) (in mm) | (g) (in mm) | ($\beta$°) |
| --- | --- | --- | --- | --- | --- |
| First film | 0.25 | 8.4 | 2.0 | 2.6 | +5°, 5 |
| Second film | 0.25 | 8.4 | 2.0 | 2.6 | −5°, 5 |
| Third film | 0.25 | 15.0 | 2.0 | 4.3 | +3°, 3 |
| Fourth film | 0.25 | 15.0 | 2.0 | 4.3 | −3°, 3 |

The fibrilled films were then superimposed on one another to form one single four-layer ribbon by means of known transmission techniques on obliquely oriented or askew axes, and welded at the edges by means of heated revolving welders, thereby obtaining one single ribbon consisting of 4 superimposed layers.

This ribbon was thereupon impregnated by passing it in a vat containing a 5% carboxymethylcellulose solution, and then through squeezing rollers, after which it was sent to the opening and thermostabilizing operations, using the apparatus illustrated in FIGS. I and II of the drawing, fitted with a guide displaying a symmetrical divergence with an $I_1/L_o$ ratio equal to 5.

In that apparatus, the ribbon, fed by 1, was gathered (picked up) by the system of pulling and feeding rollers 4, and was introduced between the pair of guides 2 where it was gripped by clamps 3 inserted on the guides by means 4, at a distance from one another of 10 cm. There was thus obtained an assembly of open nets, superimposed on each other, having a width of 100 cm, which was stabilized by heat at 155° C. by means of a heating element 5, with a dwell time, at this temperature, of about 1.5 seconds.

In consequence of the stretching of the films, the net of the four films showed a longitudinal shrinkage of 88–90%, which became visible through the reciprocal drawing closer to each other of the clamps at the end of the transversal stretching run, to about 9 cm distance from each other.

The examination of the net samples showed the following angular values $\beta_\epsilon$:
first film $\beta_\epsilon =$ about $+30°$
second film $\beta_\epsilon =$ about $-30°$
third film $\beta_\epsilon =$ about $+16°$
fourth film $\beta_\epsilon =$ about $-16°$ The resulting composite net was passed over a calender fitted with heated pressure rollers, heated at a temperature of 120° C., and was then wound up on reels.

EXAMPLE 2

On a flat head extruder of 120 cm width, there was produced a polypropylene film, using the polymer of Example 1.

The film obtained, 106 cm wide after listing, showed a thickness of 212 microns. It was stretched at 150° C. with a stretch ratio=7, thereby obtaining a film of 80 micron thickness and 40 cm width, which was subdivided into 2 films each 20 cm wide.

The 2 films were then passed contemporaneously on two fibrilling rollers similar to the first and second rollers of Example 1, thereby obtaining the characteristics already previously indicated, and more particularly the angles:
$+\beta_o = +5°,5$
$-\beta_o = -5°,5$ Two other films of the same type were allowed to pass over the fibrilling rollers similar to the third and fourth rollers of Example 1, obtaining in particular the angles:
$+\beta_o = +3°,3$
$-\beta_o = -3°,3$ The 4 films were superimposed on each other by pairs, welded together at their edges so as to form 2 ribbons, each consisting of films respectively with angles $\beta_o = \pm 5°,5$ and $\beta_o = \pm 3°,3$, which were then impregnated with carboxymethyl-cellulose.

These two pairs of fibrilled films were separately stretched transversally 7 times their original width and then thermostabilized with the technique and device described in Example 1; they displayed a longitudinal shrinkage of respectively 75% and 88%.

At the end of the stretching, there were obtained two nets, each of which was formed of 2 open fibrilled films characterized by the following values of $\beta_\epsilon$:
first net: $\beta_\epsilon = \pm 43°$
second net: $\beta_\epsilon = \pm \leq °$ The 2 nets were superimposed on each other by means of known techniques, welded at the edges and compressed at about 12° C. on a calender, thereby obtaining a final single net.

EXAMPLE 3

On a blowing-head extruder, with a 500 mm $\phi$ spinneret, there was produced a tubular film of polypropylene consisting prevailingly of isotactic macromolecules, which had a M.I. equal to 8, admixed with 15% of low-density polyethylene. The film thus obtained, which halved and listed had a width of 102 cm and a thickness of 255 microns, was stretched longitudinally at 155° C. with a drawing ratio of 6.5, thereby obtaining 2 films each 40 cm wide and 100 microns thick.

The two films were, thereupon, contemporaneously fibrillated on 2 fibrilling rollers similar to the first and second rollers of Example 1, thereby obtaining fibrilled films having the same characteristics of the first and second films of that example.

Further two unfibrilled films, equal to the preceding ones, were fibrilled on two rollers (third and fourth rollers) with a distribution of the needles characterized by the following parameters:

|  | (a) (in mm) | (c) (in mm) | (d) (in mm) | Arrangement of needles | Diameter of roller (in mm) |
| --- | --- | --- | --- | --- | --- |
| Third roller | 4.8 | 0.8 | 2.5 | + | 71.5 |
| Fourth roller | 4.8 | 0.8 | 2.5 | − | 71.5 |

The fibrillation obtained showed the following characteristics:

|  | (c) (in mm) | (e) (in mm) | (f) (in mm) | (g) (in mm) | ($\beta$°) |
| --- | --- | --- | --- | --- | --- |
| Third film | 0.8 | 7.5 | 3.2 | 1.8 | $+24°$ |
| Fourth film | 0.8 | 7.5 | 3.2 | 1.8 | $-24°$ |

The films were superimposed separately on each other in pairs and then welded together at their edges, thereby obtaining two (2) ribbons, each formed by two films with respectively $\beta_o = \pm 5°,5$ and $\beta_o = \pm 24°$.

Both ribbons were stretched separately 2.5 times their width, by means of the device used in Example 1; they were then thermostabilized, thereby obtaining two pairs of nets each 100 cm wide and each one formed of 2 layers.

After stretching, the nets proved to be formed of fibrilled films having the following angles $\beta_\epsilon$:
first and second film: $\beta_\epsilon = +15°$
third and fourth film: $\beta_\epsilon = \pm 55°$.

The two nets were then superimposed on each other so as to form one single net and were welded together at their edges by means of rotary welders and on three inside rows spaced from each other at equal distances of 25 cm each, by means of a spot welder, with the welding spots spaced from each other on the same row by 2.5 cm.

Thereupon the resulting net was compressed at 125° C. on a calender and finally wound up on reels.

What we claim is:

1. Process for the preparation in a continuous run of composite open-net shaped structures, consisting of at least two superimposed fibrilled films, said process consisting of the following operations:
   (1) preparing a film formed of at least one synthetic polymer, having a thickness comprised between 35 and 1,200 microns;
   (2) prevailingly longitudinal orientation of the film by a monoaxial stretching, with longitudinal drawing ratios comprised between 4 and 15, and with the formation of an oriented film having a thickness comprised between 15 and 200μ;
   (3) fibrilling the film thus oriented by passing it on surfaces fitted with means for producing slits, with the formation of unfibrilled, oblique bands forming an angle $\beta_o$ with the direction of the slits of the film, comprised between about 0.30° and about 50°;
   (4) superimposing at least two films thus fibrilled with the crossing of the oblique bands of each film according to any desired angle;
   (5) transversal stretching of the pack of superimposed films, thereby obtaining a rotation on the plane of the oblique unfibrilled bands of each film, until said bands form with the original slitting direction, a new angle $\beta_\epsilon$ with a value comprised between $\beta_o$ and $\pm 80°$ with respect to the direction of slitting; and (6) thermostabilizing the assembly of stretched and superimposed films.

2. The process of claim 1, in which the synthetic polymer is an olefinic polymer.

3. The process of claim 1, in which the oriented film is fibrilled by passing it on surfaces fitted with needles.

4. The process of claim 1, in which the oriented film is fibrilled by passing it on surfaces fitted with blades.

5. The process of claim 1, in which, in step (3), the fibrilled films are superimposed with the crossing of the oblique bands of each film according to any alternating order.

6. The process of claim 1, in which, in step (3), the fibrilled films are superimposed with the crossing of the oblique bands of each film according to any sequence.

* * * * *